United States Patent
Agarwal et al.

(10) Patent No.: US 12,065,615 B2
(45) Date of Patent: Aug. 20, 2024

(54) COATED PROPPANTS

(71) Applicant: Dow Global Technologies LLC, Midland, MI (US)

(72) Inventors: Praveen Agarwal, Pearland, TX (US); Juan Carlos Medina, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 75 days.

(21) Appl. No.: 17/630,808

(22) PCT Filed: Apr. 30, 2020

(86) PCT No.: PCT/US2020/030587
§ 371 (c)(1),
(2) Date: Jan. 27, 2022

(87) PCT Pub. No.: WO2021/021262
PCT Pub. Date: Feb. 4, 2021

(65) Prior Publication Data
US 2022/0275270 A1 Sep. 1, 2022

Related U.S. Application Data

(63) Continuation-in-part of application No. PCT/US2020/014508, filed on Jan. 22, 2020.

(60) Provisional application No. 62/881,149, filed on Jul. 31, 2019.

(51) Int. Cl.
*C09K 8/80* (2006.01)
*C09K 8/62* (2006.01)
*E21B 43/267* (2006.01)

(52) U.S. Cl.
CPC .............. *C09K 8/805* (2013.01); *C09K 8/62* (2013.01); *E21B 43/267* (2013.01)

(58) Field of Classification Search
CPC .......... C09K 8/805; C09K 8/62; E21B 43/267
See application file for complete search history.

(56) References Cited

U.S. PATENT DOCUMENTS

| | | | |
|---|---|---|---|
| 2,076,188 A | 4/1955 | Fitko | |
| 3,674,717 A * | 7/1972 | Fuzesi | ..................... C08B 31/00 521/169 |
| 4,088,600 A | 5/1978 | Tutein | |
| 5,169,562 A | 12/1992 | Mitchell | |
| 9,714,378 B2 | 7/2017 | Kumar | |
| 9,725,645 B2 | 8/2017 | Monastiroitis | |
| 9,896,620 B2 | 2/2018 | Zielinski | |
| 10,053,849 B2 | 10/2018 | Windebank | |
| 2013/0065800 A1 * | 3/2013 | McDaniel | .............. C09K 8/536 427/214 |
| 2014/0162911 A1 * | 6/2014 | Monastiriotis | ......... C09K 8/805 507/221 |
| 2015/0119301 A1 | 4/2015 | McDaniel | |
| 2016/0186049 A1 | 6/2016 | Bothwell | |
| 2017/0313931 A1 | 11/2017 | Chopade | |
| 2018/0072941 A1 * | 3/2018 | Goyal | ................... E21B 43/267 |
| 2018/0105735 A1 * | 4/2018 | Yang | ..................... E21B 43/267 |
| 2018/0215996 A1 | 8/2018 | Maxey | |

FOREIGN PATENT DOCUMENTS

| | | |
|---|---|---|
| WO | 2013/158306 A | 10/2013 |
| WO | 2016/160425 A | 10/2016 |
| WO | 2016/183322 A | 11/2016 |
| WO | 2017/003813 A | 1/2017 |

* cited by examiner

*Primary Examiner* — Crystal J. Lee

(57) ABSTRACT

Coated proppant particles are prepared by coating the particles with at least one polyisocyanate, and at least one urethane catalyst, and starch is present during at least part of the curing step. The starch becomes incorporated into in at least a portion of the cured coating. The coating cures rapidly at moderate temperatures, and bonds to itself well under conditions of heat and pressure as are experienced by the particles in subterranean formations.

14 Claims, No Drawings

COATED PROPPANTS

This invention relates to proppants and methods of making proppants.

Oil and natural gas are obtained by drilling into subterranean reservoirs. Often, the oil and gas products are trapped within a formation that has low porosity and low permeability and for that reason cannot be extracted easily. These formations are often hydraulically fractured by pumping fluids at high pressure and velocity into the formation. Trapped oil and gas are released from the fractured formation. The fracturing also forms flow channels through which those products can travel into the well bore, from which they can be extracted.

Because of high localized pressures, those fractures and fissures tend to close when the fracturing step is completed. This shuts off the flow channels, reducing or eliminating the flow of product to the well bore. To avoid this problem, proppants often are injected into the well along with the hydraulic fracturing fluid. The proppants are solid materials that occupy space in the fractures and thus prevent them from becoming closed off. The proppants are in the form of small particles. Sand is widely used because it is readily available, inexpensive, and has a suitable particle size. Even though the proppant particles occupy space within the fractures, there is room in spaces between them for the oil and gas products to flow.

The flow of oil and gas can wash the proppant out of the formation and back into the well, a phenomenon known as "proppant flowback". This is undesirable because the fractures partially or entirely close once the proppant is washed away, leading to decreased production rates and downtime. The proppant needs to be separated from the product, as well. The proppants, especially silica sand, are abrasive and can damage submersible pumps and other equipment if they are washed back to the wellbore.

A common way to reduce proppant flowback is by applying a polymeric coating to the particles. At the temperature and pressure conditions in the well, the polymer coating causes the particles to stick together and also to the underlying rock formation. This makes the particles more resistant to being washed out of the fractures without rendering the formation containing the bonded proppant particles unduly impermeable to the flow of oil and gas out of the well.

Among the polymers that have been used are phenolic resins, various epoxy resins, and isocyanate-based polymers that have urethane, urea, carbodiimide, isocyanurate and like linkages. Polymer-coated proppants of this type are described, for example, in WO 2017/003813, US Published Patent Application Nos. 2008-0072941 and 2016-0186049 and U.S. Pat. Nos. 9,725,645, 9,896,620 and 9,714,378.

While good performance has been obtained in some cases, there is a desire to further improve flowback resistance. The proppant particles should be free-flowing rather than agglomerated, so the particles can be carried into the formulation with the fracturing fluid. Once in place, the coated particles need to bond under the local heat and pressure conditions to reduce or eliminate proppant flowback.

In PCT/US2020/014508 is described a coated proppant prepared by coating the particles with a coating composition that includes at least one polyisocyanate and at least one ingredient selected from i) an isocyanate trimerization catalyst, ii) a carbodiimide catalyst, iii) an alcohol different from starch, iv) a polyamine and v) an alkanolamine, and curing the coating composition. Starch is present during at least part of the curing step, such that the starch becomes embedded in at least a portion of the cured coating.

This invention is a method for forming a coated proppant. The method comprises applying at least one polyisocyanate and starch to the surface of solid substrate particles, wherein the solid substrate particles are thermally stable to a temperature of at least 150° C., and reacting at least a portion of the polyisocyanate with at least a portion of the starch at the surface of the substrate particles in the presence of a urethane catalyst at an elevated temperature of up to 150° C. and for a period of up to 10 minutes to produce the solid polymeric coating at the surface of the solid substrate particles.

The invention provides significant advantages. The polymeric coating of this invention forms easily and rapidly at moderate reaction temperatures. Because the coated proppant is free flowing, it handles easily during packaging, transportation and use. Once emplaced within a subterranean formation, the particles pack well and bond well to other particles. Coated proppant particles bonded together in such a manner are resistant to proppant flowback.

Because a solid polymeric coating forms in the reaction of the polyisocyanate with hydroxyl groups on the starch, the coating composition can be simplified and rendered less expensive. Alcohols other than starch can be omitted or used only in very small quantities. Other polyisocyanate curing agents such as polyamines and aminoalcohols similarly are unnecessary and can be used in small quantities if at all. Catalysts such as isocyanate trimerization catalysts and carbodiimide catalysts, which promote the reactions of isocyanate groups with other isocyanate groups, similarly are not necessary and can be omitted.

The invention is also a coated proppant particle made using the method.

The invention is also a method of hydraulically fracturing a subterranean formation, comprising injecting a carrier fluid and coated proppant particles of the invention into the subterranean formation to cause the subterranean formation to form fractures, whereby at least a portion of the coated proppant particles are retained in the fractures.

The substrate particle can be of any material that is solid and thermally stable at a temperature of at least 150° C. Preferably, the substrate particle is heat-stable at a temperature of at least 200° C. and more preferably at least 300° C. By "heat-stable", it is meant that the substrate particle does not melt or otherwise heat-soften to form a flowable material, thermally degrade, or thermally decompose, at the stated temperature. Examples of substrate particles include sand and other mineral and/or ceramic materials such as aluminum oxide, silicon dioxide, titanium dioxide, zinc oxide, zirconium dioxide, cerium dioxide, manganese dioxide, iron oxide, calcium oxide, boron nitride, silicone carbide, aluminum carbide, bauxite, aluminum oxide and glass, as well as metals such as metal shot.

The substrate particles may have a particle size such that at least 90 weight-% of the particles pass through a U.S. 15 mesh screen, which has nominal 4.0 mm openings. In some embodiments, at least 90 weight-% of the substrate particles pass through a U.S. 10 mesh screen, which has nominal 2.0 mm openings, or at least 90 weight-% pass through a 20 mesh screen, which has nominal 1.0 mm openings. In some embodiments least 90 weight-% of the substrate particles preferably are retained on a U.S. 400 mesh screen, a U.S. 200 mesh screen, or a U. S. mesh 140 screen, which have nominal openings of 0.037 mm, 0.074 mm and 0.105 mm, respectively. Because the coating weights are low, as described below, the coatings are thin and the coated proppants generally have similar particle sizes.

The polyisocyanate preferably has an average functionality from about 1.9 to 4, and more preferably from 2.0 to 3.5. It is preferably a liquid at the application temperature. The average isocyanate equivalent weight can be from about 80 to 500, more preferably from 80 to 200 and still more preferably from 125 to 175. The polyisocyanate can be aromatic, aliphatic and/or cycloaliphatic. Exemplary polyisocyanates include, for example, m-phenylene diisocyanate, 2,4- and/or 2,6-toluene diisocyanate (TDI), the various isomers of dip henylmethanediisocyanate (MDI), hexamethylene-1,6-diisocyanate, tetramethylene- 1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane tri-isocyanate, polymethylene polyp henylisocyanates, hydrogenated polymethylene polyphenylisocyanates, toluene-2,4,6-triisocyanate, and 4, 4'-dimethyl diphenylmethane-2, 2', 5, 5'-tetraisocyanate. Preferred polyisocyanates include MDI and derivatives of MDI such as biuret-modified "liquid" MDI products and polymeric MDI. "Polymeric MDI" is a mixture of MDI (any isomer or mixture of isomers) with one or more polymethylene polyphenylisocyanates that have three or more phenylisocyanate groups. The "polymeric MDI" may have, for example, an isocyanate equivalent weight of 126 to 150 and a number average isocyanate functionality of 2.05 to 3.5, especially 2.2 to 3.2 or 2.2 to 2.8.

A mixture of two or more polyisocyanates may be present.

The starch is a polymeric carbohydrate of glucose units joined by glycosidic bonds, being solid at 23° C. The polymeric carbohydrate molecules may be unbranched or branched. Starch is typically a mixture of amylose, which is a linear and helical polysaccharide made up of α-D-glucose units bonded through α(1→4) glycosidic bonds and no more than one α(1→6) glycosidic bond per 50 glucose units, and amylopectin, which is made up of α-D-glucose units bonded through α(1→4) glycosidic bonds and greater than one α(1→6) glycosidic bond per 50 glucose units.

Examples of useful starches are products of one or more plants such as, for example, cereals such as maize, wheat, barley, millet, oats, rye, buckwheat and rice; root vegetable such as potatoes, sweet potatoes, yams and cassava; as well as other plant sources such as acorns, arrowroot, arrachach, bananas, breadfruit, canna, colcasia, katakuri, kudzu, malange, sago, oca, sorghum, taro, chestnuts and water chestnuts. Corn, wheat, potato, rice and cassava starch are entirely suitable. Modified forms of starch such as pregelatinized starch can be used.

The starch may be modified by imparting, for example, cationic groups and/or anionic groups, by crosslinking the starch, esterifying the starch, alkoxylating the starch, and/or by adding various additives to the starch, provided the starch retains hydroxyl groups for reaction with isocyanate groups of the polyisocyanate. Modified starches having cationic groups may include quaternary ammonium-modified starches. These can be produced, for example, by reacting starch with a quaternary ammonium salt and an alkali as described, for example, in U.S. Pat. Nos. 4,088,600, 5,169, 562, and by E.F. Paschall in Chapter 16 ("Production and Uses of Cationic Starches") of *Starch: Chemistry and Technology*, Whistler et al., eds. (1967). Other modified starches include carboxylated starch, which can be prepared by treating starch with an oxidizing agent such as hydrogen peroxide, ammonium persulfate, or sodium hypochlorite under alkaline conditions, and phosphorylated starch, which can be prepared by treating starch with sodium tripolyphosphate (STPP) or sodium trimetaphosphate (STMP). Modified starches of the foregoing types are readily commercially available.

Other modified starches include crosslinked starch produced by reacting starch with a crosslinker such as citric acid, propionic acid, sodium tripolyphosphate, sodium trimetaphosphate, and sodium hypophosphite. Still other starches include those containing an additive such as calcium chloride, potassium iodide, potassium hydroxide, and/or various chloride, carbonate, sulfate, hydroxide, iodide, bromide and thiocyanate salts of alkali metals.

The starch is conveniently provided in the form of a powder with, for example, at least 50 volume-% of the particles having a particle size, as measured by sieving, of at most 100 μm or of at most 50 μm. In some embodiments, at least 90 volume-% of the particles have a particle size, as measured by sieving, of at most 100 μm or at most 50 μm or at most 35 μm. The starch particles preferably are smaller than the proppant particles and may have Dv50 particle sizes no greater than 50% and more preferably no greater than 25% or no greater than 10% of the Dv50 particle size of the proppant particles.

The urethane catalyst is a catalyst for the reaction of an isocyanate group toward an alcohol. Among such catalysts are tin (II) and tin (IV) catalysts, catalysts that contain other Group III to Group XV metals; tertiary amine compounds, amidines, tertiary phosphines, and the like. Useful tin catalysts include stannic chloride, stannous chloride, stannous octoate, stannous oleate, dimethyltin dilaurate, dibutyltin dilaurate, dioctyltin dilaurate, dimethyltin dioctoate, dibutyltin dioctoate, dioctyltin dioctoate, dimethyltin dineodecanoate, dibutyltin dineodecanoate, dioctyltin dineodecanoate, dimethyltin dioleate, dibutyltin dioleate, dioctyltin dioleate, tin ricinoleate and other tin compounds of the formula $SnR_n(OR)_{4-n}$, wherein R is alkyl or aryl and n is 0 to 18, dialkyl tin mercaptides, dialkyl tin thioglycolates and the like.

The polyisocyanate and starch are applied to the surface of the solid substrate particles and cured to form the solid polymeric coating. During the curing, at least a portion of the polyisocyanate reacts with at least a portion of the starch at the surface of the substrate particles. Curing is performed in the presence of the urethane catalyst.

The amount of polyisocyanate is conveniently 0.1 to 10 parts by weight of the polyisocyanate per 100 parts by weight of the substrate particles. A preferred amount is 0.1 to 5, 0.1 to 2.5, or 0.1 to 1.5 parts by weight of the polyisocyanate, on the same basis. The amount of starch may be, for example, from 0.1 to 200 parts by weight per 100 parts by weight of the polyisocyanate. A preferred amount is at least 10 parts or at least 25 parts, on the same basis, and up to 150 parts, up to 125 parts, up to 100 parts or up to 90 parts, on the same basis. The urethane catalyst is present in catalytic quantities, such as from 0.01 to 5 parts by weight per 100 parts by weight of the polyisocyanate.

The polyisocyanate, starch and urethane catalyst may be applied to the substrate particles simultaneously or in any order. It is generally preferred to apply the polyisocyanate before adding any of the starch. It is often convenient to combine the polyisocyanate with the urethane catalyst and apply them both simultaneously.

In some embodiments, the starch is applied in increments. Thus in a particular embodiment, a first increment of the starch is applied to the solid substrate particles prior to, simultaneously with or (most preferably) after applying the polyisocyanate to the surface of the solid substrate particles. In such an embodiment, the polyisocyanate and first increment starch are partially reacted at the surface of the solid substrate particles to form a partially cured coating having unreacted isocyanate groups. For example, 20 to 80% of the isocyanate groups of the polyisocyanate may react during this first partial reaction step. The partially cured coating is then contacted with at least one subsequent increment of the starch, followed by further reaction of the polyisocyanate and the starch. Curing is continued until a solid coating is produced on the surface of the substrate particles such that the coating is no longer tacky and the coated proppant particles are free-flowing.

Some or all of the starch, whether added all at once or in increments, reacts with isocyanate groups on the polyisocyanate to produce urethane linkages. Some of the starch may not react in this way, instead becoming physically incorporated into the solid polymeric coating, by becoming embedded in or adhered to the coating or otherwise. Some of the starch may become incorporated into the coating via both chemical bonding and physical mechanisms. In some embodiments, particularly those in which the starch is added in increments, starch particles may accumulate at or near the surface of the solid polymeric coating.

When the starch is added in increments, at least 10%, at least 20%, at least 30% or at least 40%, and up to 90%, up to 80%, or up to 70% of the starch may be added in the first increment, with the remainder being added in one or more subsequent increments.

The various ingredients can be applied to the substrate particles by spraying or other suitable method. The substrate particles are preferably stirred or otherwise agitated as the various ingredients are applied and the curing is performed. The substrate particles may be, for example, disposed in a fluidized bed, in a stirred container or other device that permits the particles to be separated and individually coated.

Curing (i.e., the reaction of the polyisocyanate with starch and certain other optional ingredients, if present, to form the solid polymeric coating) can be performed at a temperature as low as 0° C., but is preferably performed a temperature of at least 20° C. and more preferably at an elevated temperature of up to 150° C. The elevated temperature preferably is at least 50° C. or at least 60° C. and may be up to 125° C., up to 100° C., up to 90° C. or up to 80° C. An advantage of this invention is that the curing takes place rapidly at such moderately elevated temperatures to form free flowing coated proppant particles. The curing time at such temperatures is typically no greater than 10 minutes and may be as short as one minute. A typical curing time may be 1.5 to 5 minutes or 2 to 5 minutes.

It is generally convenient to heat the substrate particles to the curing temperature before applying the various ingredients that form the coating. The applied ingredients in such cases may be heated to the curing temperature by transfer of heat from the substrate particles, without the need to apply further heating during the curing process. Alternatively, heat can be applied to the substrate particles during the curing step to maintain a suitable curing temperature.

Agitation should be provided during the curing step to avoid agglomeration.

The substrate particles can be coated in a continuous coating process. In one embodiment of such a continuous coating process, the substrate particles are first washed and then dried at a first predetermined elevated temperature such as, for example, 500° C. to 1500° C. The particles are then cooled to a second, lower predetermined temperature such as 50° C. to 220° C., and fed into an inlet of a combined continuous mixer and conveyor unit. The ingredients that form the coating are fed into the combined continuous mixer and conveyor unit, where they are mixed with the substrate particles and the coated particles are conveyed through the combined continuous mixer and conveyor unit. The temperature needed for curing in some embodiments is provided by transfer of heat from the particles; alternatively heating can be applied in the mixer and/or conveyor unit to maintain a suitable curing temperature. The coated particles are discharged from an outlet of the combined continuous mixer and conveyor unit. In such a process, the various ingredients may be fed separately into the combined continuous mixer and conveying unit at two or more locations along a travel path of the combined continuous mixer and conveyor unit. Multiple continuous mixers connected in series or parallel can be utilized to achieve the required throughput and curing time. Starch can be added to the substrate particles using loss in weight type feeders.

In preferred embodiments, at least a portion of the curing step is performed in the presence of at least one adhesion promoter. An adhesion promoter has been found to increase bonding between the coated proppant particles under conditions of elevated temperature, pressure and moisture. In particular, the adhesion promoter has been found to increase bonding at lower bonding temperatures such as 40 to 60° C., compared to an otherwise like case in which the adhesion promoter is not present. Examples of suitable adhesion promoters include hydrolysable silane compounds such as aminosilanes (for example, 3-aminopropyl triethoxysilane, 3-aminopropyl trimethoxysilane and/or 3-aminopropyldiethoxymethyl silane and other silanes having a primary or secondary amine group and at least one silane group having at least one hydrolysable substitute), and epoxysilanes (which have at least one epoxy group and at least one silane group having at least only hydrolysable substituent). The adhesion promoter, when present, may be present in an amount of at least 0.5, at least 1, at least 2, at least 4 or at least 6 parts by weight per 100 parts by weight of the polyisocyanate, and, for example, up to 20 parts, up to 15 parts, up to 12 parts or up to 10 parts by weight on the same basis.

It is preferred to apply the adhesion promoter to the substrate particles after at least a portion of the starch is added and before curing is completed.

In a particular embodiment, the polyisocyanate is applied to the surface of the substrate particles and partially cured by reaction with at least a portion of the starch to produce a partially cured coating, an adhesion promoter is thereafter applied to the particles, and the partially cured coating is thereafter cured further to produce a solid polymeric coating.

In another particular embodiment, a first increment of the starch is applied to the solid substrate particles prior to, simultaneously with or after applying the polyisocyanate to the surface of the solid substrate particles. The polyisocyanate and the first increment of the starch are partially reacted at the surface of the solid substrate particles to form a partially cured coating having unreacted isocyanate groups. For example, 20 to 80% of the isocyanate groups may remain unreacted in the partially cured coating. In such an embodiment, the adhesion promoter is thereafter applied to the particles, at least one subsequent increment of the starch is applied to the coating particles after the adhesion promoter is applied, and the partially cured coating is thereafter cured further to produce a solid polymeric coating.

When a silane adhesion promoter is present, a silane curing catalyst, i.e., a catalyst for the reaction of a hydrolysable silane group with water to produce a silanol, may be applied to the substrate particles before or after curing is completed. Among the useful silane curing catalysts include various acids and bases as described for example, by F. O. Stark et al., Silicones, Comprehensive Organometallic Chemistry, vol. 2, 305, Pergamon Press, 1982 and by W. NOLL, Chemistry and Technology of Silicones, Academic Press, 1968. Metallic catalysts such as tin, lead or gold catalysts are also useful. In some embodiments, the urethane catalyst also functions as the silane curing catalyst, in which case no additional silane curing catalyst is needed. Thus, in some embodiments, a single material can function as both the silanol catalyst and as the urethane.

Examples of silanol curing catalysts include dibutyltin dilaurate, dimethyltin dilaurate, dibutyltin dioctoate, dimethyltin dioctoate, stannous octoate, stannous oleate, stannic chloride, stannous chloride, di-n-butyl tin bis(mercaptoacetic acid isooctyl ester) and other organotin compounds of the formula $SnR_n(OR)_{4-n}$, wherein R is alkyl or aryl and n is 0-2, 1,8-diazabicyclo [5.4.0] undec-7-ene (DBU), 6-(dibutylamino)-1,8-diazabicyclo[5.4.0]undec-7-ene, where the butyl group may be n-butyl, sec-butyl or t-butyl, trimethylamine, triethylamine, dimethylethanolamine, N-methylmorpholine, N-ethylmorpholine, N,N-dimethylbenzylamine, N,N-dimethylethanolamine, N, N, N', N'-tetramethyl- 1, 4-butanediamine, N, N-dimethylpiperazine, tetramethylguanidine, 1,4-diazobicyclo-2,2,2-octane, bis(dimethylaminoethyl)ether, bis(2-dimethylaminoethyl) ether, morpholine,4,4'-(oxydi-2,1-ethanediyl)bis, triethylenediamine, pentamethyl diethylene triamine, dimethyl cyclohexyl amine, N-cetyl-N,N-dimethyl amine, N-coco-morpholine, N,N-dimethyl aminomethyl N-methyl ethanolamine, N, N, N'-trimethyl-N'-hydroxyethyl bis(aminoethyl) ether, N, N-bis(3-dimethylaminopropyl)N-isopropanolamine, (N,N-dimethyl) amino-ethoxy ethanol, N, N, N', N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine, benzylamine, dibenzylamine, tribenzylamine, butyldodecylamine, and methyl-hydroxyethyl piperazine.

Other optional ingredients may be present during the coating process.

Among the optional ingredients are powders different from starch having a particle size as mentioned above with respect to the starch. Such powders may be provided in the form a dispersion in water or other diluent. Such powders preferably have a particle size such that at least 80 volume percent have a particle size, as measured by sieving methods, of at most 100 μm, preferably at most 50 μm or at most 35 μm. The starch particles preferably are smaller than the proppant particles and may have Dv50 particle sizes no greater than 50% and more preferably no greater than 25% or no greater than 10% of the Dv50 particle size of the proppant particles. The particles may be as small as, for example 10 nanometers. When such powders are used, they are preferably applied to the substrate particles after the polyisocyanate and after at least some or all of the starch has been applied, and more preferably after partial curing but prior to complete curing. The powders may be made of various organic and/or inorganic materials that are thermally stable at the process temperatures. The powders then may be a cellulosic material, ligno-cellulosic material or other plant or vegetable fiber; ground animal bones; various ceramics; various minerals such as sand or clay particles; fumed silica, micronized silica, polymers of a synthetic polymer, and the like.

Other optional ingredients include alcohols different than starch, polyamines and aminoalcohols. However, an advantage of this invention is that isocyanate-reactive materials other than starch are not necessary and can be omitted. If used, such alcohols, polyamines and aminoalcohols preferably are used in small quantities, such as, for example up to 20 parts by weight, up to 10 parts by weight, up to 5 parts by weight, up to 2 parts or up to 1 part by weight per 100 parts by weight of the polyisocyanate.

Alcohols other than starch that can be present include monoalcohols, and polyalcohols having 2 to 8 hydroxyl groups, in each case different than starch. Such an alcohol may have a hydroxyl equivalent weight of up to 2500 g/equivalent, but the hydroxyl equivalent weight preferably is no greater than 1000, no greater than 500. Each alcohol preferably has a boiling temperature of at least 80° C., more preferably at least 100° C. and a molecular weight of at least 60 g/mol. For purposes of this invention, "alcohols" do not include compounds that have one or more amino groups, which are included within the polyamine and/or aminoalcohols mentioned below.

Monoalcohols include, for example, alkanols such as any one or more isomers of propanol, butanol, pentanol, hexanol, octanol, decanol, dodecanol, tetradecanol, hexadecanol, octanol, as well as higher alkanols having up to, for example, 60 carbon atoms, especially up to 40 carbon atoms. Other monoalcohols include poly(alkylene glycol) monoethers and poly(alkylene glycol)monoesters such as poly(ethylene glycol) monoethers, poly(ethylene glycol) monoesters), poly(1,2-propylene glycol) monoethers, poly (1,2-propylene glycol) monoesters, monoethers and monoesters of random and/or block copolymers of 1,2-propylene glycol and ethylene glycol; monoethers and monoesters of 1,2- and/or 2,3-butylene oxide; and the like. The ether group may be an alkyl ether group having up to, for example 40 carbon atoms, including methoxy, ethoxy, isopropoxy, n-propoxy, butoxy (any isomer), pentanoxy, hexanoxy, octanoxy, decanoxy, undecanoxy, dodecanoxy, tetradecanoxy, hexadecanoxy, octanoxy and the like. The ether group may be an aromatic ester such as phenoxy or alkyl-substituted phenoxy. The ether group may contain aliphatic carbon-carbon unsaturation as in the case, for example, of a vinyl ether, allyl ether or propenyl ether. The ester group may be, for example, an alkyl ester having up to 40 carbon atoms including formate, acetate, propionate, butanoate, pentanoate, hexanoate, octanoate, decanoate, undecanoate, dodecanoate, tetradecanoate, hexadecanoate and octadecanoate esters. The ester group may contain aliphatic carbon-carbon unsaturation, such as an acrylate, methacrylate or stearate ester. The ester group may be aromatic or substituted aromatic ester.

Polyalcohols may have, for example, 2 to 8 hydroxyl groups per molecule and no primary or secondary amino groups. Examples of polyols include ethylene glycol, diethylene glycol, triethylene glycol, 1,2-propanediol, 1,3-propane diol, dipropylene glycol, tripropylene glycol, 1,4-butane diol, 1,6-hexane diol, 1,8-octane diol, glycerin, trimethylolpropane, trimethylolethane, pentaerythritol, erythritol, sorbitol, mannitol, sucrose, triethanolamine, triisopropanolamine and cyclohexanedimethanol. Other polyalcohols include polyether polyols and polyester polyols.

Small amounts of polyalcohols may be provided in the form of solvents or carriers for other ingredients such as the urethane or other catalysts.

Polyamine compounds are compounds that have two or more primary and/or secondary amino groups. Such an amine compound may have an equivalent weight per primary and/or secondary amino group of up to 2500 g/equivalent, but the equivalent weight preferably is no greater than 1000, no greater than 500. Each polyamine compound preferably has a boiling temperature of at least 80° C., more preferably at least 100° C. and a molecular weight of at least 60 g/mol. The primary and/or secondary amino groups of the polyamine compounds may be bonded directly to aliphatic or aromatic carbon atoms. Examples of polyamine compounds include aliphatic amines such as ethylene diamine, 1,2-propylene diamine, 1,3-propylene diamine, 1,4-butane diamine and 1,6-hexamethylene diamine, other α,ω-alkylene diamines, polyalkylenepolyamines having 3 or more amino groups such as polyethylenepolyamines, aromatic di- and polyamines such as phenylene diamine, toluene diamine and diethyltoluene diamine, and amine-terminated polyethers.

Aminoalcohols have at least one hydroxyl group and at least one primary and/or second amino group. These may have formula weights of, for example, up to 3000, preferably up to 1000 and more preferably up to 500. Among these are, for example, diethanolamine, monoethanolamine, aminoethylethanolamine, diisopropanolamine, monoisopropanolamine, and the like.

Water may be present during the curing step. A small amount may be carried into the curing step with the starch or other hygroscopic materials, and/or as a solvent or carrier for one or more of the components. In some embodiments, water is absent or present in only small quantities such as no more than 5, no more than 2 or no more than 1 part by weight per 100 parts by weight of the polyisocyanate. When water is supplied as a carrier for another material, somewhat greater amounts may be present during the curing step, such as up to 100 parts by weight per 100 parts by weight of the polyisocyanate.

Similarly, one or more other solvents or carriers may be present, for example, as a liquid phase in which the starch, optional powders or other ingredients are dispersed. Such solvents or carriers, if isocyanate-reactive, are preferably present in at most small quantities such as described above with respect to optional alcohols, polyamines and aminoalcohols.

Among the other optional ingredients are isocyanate trimerization catalysts and carbodiimide catalysts. These may be absent, as an advantage of this invention is the solid polymer forms in a reaction of starch with the polyisocyanate and thus other curing mechanisms such as isocyanurate and/or carbodiimide formation are not needed to produce the solid polymer coating.

An isocyanate trimerization catalyst is a material that promotes the reaction of isocyanate groups with other isocyanate groups to form isocyanurate rings. It preferably is at most a weak urethane and urea-forming catalyst, i.e., has little if any catalytic activity toward the reaction of an isocyanate group with an alcohol, water or a primary or secondary amine group under the conditions of the curing step. It is also preferably at most a weak carbodiimide catalyst, i.e., has little if any catalytic activity toward the reaction of isocyanate groups to form carbodiimides. Useful isocyanate trimerization catalysts include strong bases such as alkali metal phenolates, alkali metal alkoxides, alkali metal carboxylates, quaternary ammonium salts, and the like. Specific examples of such trimerization catalysts include sodium p-nonylphenolate, sodium p-octyl phenolate, sodium p-tert-butyl phenolate, sodium acetate, sodium 2-ethylhexanoate, sodium propionate, sodium butyrate, the potassium analogs of any of the foregoing, trimethyl-2-hydroxypropylammonium carboxylate salts, and the like.

The isocyanate trimerization catalyst may be provided in the form of a dispersion or solution in a carrier. The carrier in some embodiments is a polyalcohol such as ethylene glycol, diethylene glycol, propylene glycol, dipropylene glycol and the like.

Examples of useful commercially available trimerization catalysts include those sold as Dabco ® TMR18, Dabco® TMR-30, Dabco® TMR2, Dabco® TMR-7, Dabco® TMR-20 and Dabco® TMR catalysts, from Air Products and Chemicals, Inc.

The isocyanate trimerization catalyst, when present, is present in catalytic quantities, such as from 0.05 to 15 parts by weight per 100 parts by weight of the polyisocyanate. In specific embodiments, this catalyst may be present in an amount up to 10, up to 5, up to 2.5, up to 1, up to 0.5 or up to 0.25 parts by weight per 100 parts by weight of the polyisocyanate. It may be absent.

In some other embodiments, the curing step is performed in the presence of at least one carbodiimide catalyst, i.e., a material that catalyzes the reaction of isocyanate groups to form carbodiimide linkages. Among the useful carbodiimide catalysts are phospholene oxides such as 3-methyl-1-phenyl-2-phospholene oxide (MPPO), 3-methyl-1-ethyl-2-phospholene oxide (MEPO), 3,4-dimethyl-1-phenyl-3-phospholene oxide, 3,4-dimethyl-1-ethyl 3-phospholene oxide, 1-phenyl-2-phospholen-1-oxide, 3-methyl- 1-2-phospholen-1-oxide, 1-ethyl-2-phospholen- 1-oxide, 3-methyl-1-phenyl-2-phospholen-1-oxide, and 3-phospholene isomers thereof.

The carbodiimide catalyst, when present, is present in catalytic quantities, such as from 0.0001 to 10 parts by weight per 100 parts by weight of the polyisocyanate. In specific embodiments, this catalyst may be present in an amount up to 1, up to 0.5, up to 0.1 or up to 0.05 parts by weight per 100 parts by weight of the polyisocyanate. It may be absent.

In particular embodiments, no more than 0.025 part by weight or no more than 0.01 part by weight of an alkali metal phenolate, an alkali metal alkoxide, an alkali metal carboxylate, a quaternary ammonium salt, and a phospholene oxide are present per 100 parts by weight of the polyisocyanate.

The coated proppant particles resulting from the foregoing process can be used in the same manner as conventional proppant particles. In a typical hydraulic fracturing operation, a hydraulic fracturing composition, comprising a fracturing fluid, the coated proppant, and optionally various other components is prepared. The fracturing fluid can be a wide variety of fluids such as kerosene and water. Various other components that can be added to the mixture include, but are not limited to, guar and polysaccharides, and well as other components as may be useful.

The fracturing fluid may contain a gelling agent to help prevent the proppant particles from settling prematurely. Such a gelling agent may be dissolved once the formation has been fractured to allow the proppant particles to deposit into the fractures.

The mixture is pumped into the subterranean formation under pressure to create or enlarge fractures in the subterranean formation. Coated proppant particles enter into the fractures and are retained there. When the hydraulic pressure is released, the coated proppant holds the fractures open, thereby maintaining a flow path through the fractures to facilitate the extraction of petroleum fuels or other fluids from the formation to the wellbore.

Another advantage of the invention is that the coated proppant bonds to itself under conditions of elevated temperature and pressure. This property permits the coated proppants to form agglomerated masses within the subterranean fracture. The agglomerated masses are more resistant to proppant flowback than are the individual proppant particles.

The ability of the coated proppant to bond to itself can be measured in accordance with the unconfined compressive strength (UCS) test described in the following examples. When bonded together under conditions of 1000 psi (6.89 MPa) and 50° C. for 16 hours, the compressive strength of the resulting bonded mass, as measured by the USC test, is in preferred embodiments at least 2 kPa. The compressive strength on this test may be at least 5 kPa, at least 10 kPa, at least 15 kPa, at least 20 kPa, at least 50 kPa or at least 150 kPa and may be up to 500 kPa, up to 400 kPa or up to 300 kPa.

The following examples are provided to illustrate the invention, and are not intended to limit the scope thereof. All parts and percentages are by weight unless otherwise indicated.

The Polyisocyanate is a polymeric MDI product having an isocyanate functionality of 2.7 isocyanate groups per molecule and an isocyanate content of 30.4-32.0%.

The Catalyst is a urethane catalyst product commercially available from Air Products as Dabco® T-12 catalyst. It contains at least 95% by dibutyltin dilaurate.

The sand used in the following experiments is a 40/70 mesh sand product,

The starch is a powdery cornstarch unless otherwise indicated. The particle size is less than 100 μm.

EXAMPLES 1-5

Coated proppants are made using the ingredients indicated in Table 1.

750 grams of sand is preheated to 80° C. and loaded into a Hobart type laboratory mixer. A heating jacket is used to maintain the sand temperature in the range of 65-75° C. during the curing step. Dibutyltin dilaurate is combined with the Polyisocyanate and then added to the hot sand with mixing (t=0 sec). At t=20 seconds, mixing is stopped and a first addition of cornstarch is made. Mixing is restarted. The 3-aminopropyltriethoxylsilane is added at t=90 seconds (at which time curing is at least partially completed), followed by the second cornstarch at t=120 seconds. At t=180 seconds the curing step is completed and a sand particles are coated with a solid polymeric coating. The coated sand is removed from the mixer at t=180 seconds (240 seconds for Example 1) and sieved to remove agglomerates. The coated sand product thus obtained is discharged into plastic bags and stored at room temperature for several days before being evaluated for unconfined compressive strength (UCS) and sand quality.

UCS is measured by first sieving the coated sand through 1 mm metal screens. The sieved sand is mixed with a solution of 2% potassium chloride in water, at a weight ratio of 4 parts sand to 3 parts solution. 1 drop of dish soap is added to eliminate air entrainment. The resulting slurry is allowed to stand for 5 minutes, and then loaded into a 1.125 inch (2.86 mm) interior diameter steel cylindrical cell with removable top and bottom assemblies. Excess water is drained from the cell. A piston is placed at the top of the sample chamber and hammered into the cell. The top assembly equipped with a pressure relief valve and a nitrogen inlet is attached to the cell. The cell is pressurized to 1000 psi (6.89 MPa) with nitrogen, then kept overnight in a 50° C. oven. The cell is then cooled to room temperature. The sand plug is removed from the cell and dried under ambient conditions for a few days to remove absorbed water. The plug is then broken into 2-inch (5.08 cm) pieces that are filed at the edges to smooth them. Plugs are tested for compressive strength using an MTS insight electromechanical testing system with a 2000 kilonewton load cell and a compression rate of 0.01 inch/minute (0.254 mm/minute). The peak stress value is reported as the USC.

TABLE 1

|  | Example No. | | | | |
| --- | --- | --- | --- | --- | --- |
|  | 1 | 2 | 3 | 4 | 5 |
| Sand, pbw | 750 | 750 | 750 | 750 | 750 |
| Polyisocyanate, pbw | 5.3 | 6.4 | 4.2 | 3.1 | 3.1 |
| Catalyst, pbw | 0.15 | 0.16 | 0.10 | 0.08 | 0.1 |
| Cornstarch, first addition, pbw | 2.2 | 1.1 | 3.3 | 4.4 | 4.4 |
| 3-aminopropyl triethoxysilane | 0.6 | 0.6 | 0.6 | 0.6 | 0.3 |
| Cornstarch, second addition, pbw | 2 | 2 | 2 | 2 | 1.5 |
| Cycle Time, s | 240 | 180 | 180 | 180 | 180 |
| Sand Quality | FF | FF | FF | FF | FF |
| UCS 50° C., psi (kPa) | 20 (138) | 22 (152) | 33 (228) | 23 (159) | 15 (103) |

"FF" is "free-flowing" on the dry-caking test.

As shown by the data in Table 1, the coated proppants of the invention are free flowing powders that bond strongly under pressure at only 50° C. Because of the ability to bond strongly at such a low temperature, the coated proppants are useful for treating even lower temperature wells.

What is claimed is:

1. A method for forming a coated proppant, comprising applying at least one polyisocyanate and starch to the surface of solid substrate particles, wherein the solid substrate particles are thermally stable to a temperature of at least 150° C., and reacting at least a portion of the polyisocyanate with at least a portion of the starch at the surface of the substrate particles in the presence of a urethane catalyst at an elevated temperature of up to 150° C. and for a period of up to 10 minutes to produce a solid polymeric coating at the surface of the solid substrate particles.

2. The method of claim 1, wherein a first increment of the starch is applied to the solid substrate particles prior to, simultaneously with or after applying the at least one polyisocyanate to the surface of the solid substrate particles, the polyisocyanate and starch are partially reacted at the surface of the solid substrate particles to form a partially cured coating having unreacted isocyanate groups, the partially cured coating is then contacted with at least one subsequent increment of the starch, and partially cured coating is thereafter cured further.

3. The method of claim 1 wherein the polyisocyanate is applied to the surface of the substrate particles and partially cured by reaction with at least a portion of the starch to produce a partially cured coating, an adhesion promoter is thereafter applied to the particles, and the partially cured coating is thereafter cured further.

4. The method of claim 1 wherein a first increment of the starch is applied to the solid substrate particles prior to, simultaneously with or after applying the polyisocyanate to the surface of the solid substrate particles, the polyisocyanate and the first increment of the starch are partially reacted at the surface of the solid substrate particles to form a partially cured coating having unreacted isocyanate groups, an adhesion promoter is thereafter applied to the particles, at least one subsequent increment of the starch is applied to the coating particles after the adhesion promoter is applied, and the partially cured coating is thereafter cured further.

5. The method of claim 3 wherein the adhesion promoter is an aminosilane.

6. The method of claim 3 wherein the temperature is 80° C. to 150° C.

7. The method of claim 1 wherein the elevated temperature 50° C. to 80° C.

8. The method of claim 1 wherein 0.1 to 10 parts by weight of polyisocyanate is applied to the surface of the substrate particles per 100 parts by weight substrate particles.

9. The method of claim 1 wherein the polyisocyanate is a polymeric methylene diphenyl diisocyanate.

10. The method of claim 1 wherein the substrate particles are sand.

11. The method of claim 1 wherein the curing step is performed in the presence of no more than 5 parts by weight of an alcohol different than starch, a polyamine and/or an aminoalcohol per 100 parts by weight of the polyisocyanate.

12. The method of claim 1 wherein the curing step is performed in the presence of no more than 0.01 part by weight of an alkali metal phenolate, an alkali metal alkoxide, an alkali metal carboxylate, a quaternary ammonium salt, and a phospholene oxide are present per 100 parts by weight of the polyisocyanate.

13. A coated proppant particle made in the method of claim 1.

14. A method of hydraulically fracturing a subterranean formation, comprising injecting a carrier fluid and coated proppant particles of claim 13 into the subterranean formation to cause the subterranean formation to form fractures, whereby at least a portion of the coated proppant particles are retained in the fractures.

* * * * *